United States Patent [19]

Cohen

[11] Patent Number: 4,588,856
[45] Date of Patent: May 13, 1986

[54] AUTOMATIC LINE IMPEDANCE BALANCING CIRCUIT FOR COMPUTER/TELEPHONE COMMUNICATIONS INTERFACE

[75] Inventor: Sam G. Cohen, Pleasantville, N.Y.

[73] Assignee: Timex Computer Corporation, Waterbury, Conn.

[21] Appl. No.: 643,513

[22] Filed: Aug. 23, 1984

[51] Int. Cl.[4] ............................................. H04M 11/00
[52] U.S. Cl. ................................. 179/2 C; 179/2 DP
[58] Field of Search ............... 179/2 C, 2 DP, 170 D; 375/7–9; 370/24, 25, 32

[56] References Cited

U.S. PATENT DOCUMENTS

| | | | |
|---|---|---|---|
| 2,186,006 | 1/1940 | Buckingham | 370/25 |
| 4,096,362 | 6/1978 | Crawford | 179/170 D |
| 4,320,498 | 3/1982 | Justice | 370/32 X |
| 4,365,119 | 12/1982 | Chung et al. | 179/170 D X |

Primary Examiner—Gene Z. Rubinson
Assistant Examiner—W. J. Brady
Attorney, Agent, or Firm—William C. Crutcher

[57] ABSTRACT

A telephone communications interface adapted to provide a data link for receiving and transmitting serial data via FSK modulated carrier signals over telephone lines to a computer. An operational amplifier in a duplexer circuit has a variable impedance feedback circuit, which is automatically adjusted by a computer subroutine to adjust the amplifier gain, so as to compensate for variations in the telephone company line impedance. The gain is adjusted to minimize the amplitude of any transmitted carrier signal, which might appear at the input of the conventional band pass filter for the receiver carrier signal.

6 Claims, 3 Drawing Figures

AUTOMATIC LINE IMPEDANCE BALANCING CIRCUIT FOR COMPUTER/TELEPHONE COMMUNICATIONS INTERFACE

BACKGROUND OF THE INVENTION

This invention relates to an asynchronous modem for switched network telepone connection, and more particularly to an automatic line balancing arrangement which compensates for variations in telephone company line impedance. Communciations interface devices, sometimes known as "modems" are commercially available as stand-alone units which may be connected between a personal computer and the telephone lines, in order to receive data from a distant "host" computer. Although the telephone line impedance is theoretically 600 ohms, so that ideally the modem connected to the telephone line would present an output impedance of 600 ohms for maximum power transfer, the impedance of the telephone company line varies in actual practice. Some modems provide a manual adjustment in order to balance the modem output impedance and the line input impedance. However, it would be desirable to accomplish the line balancing automatically.

U.S. Pat. No. 2,186,006—Buckingham shows a method for balancing a duplex circuit by making manual adjustments to an artificial line concurrently with making observations on a cathode ray tube, so as to reduce the magnitude of unbalance between the circuit and the artificial line.

U.S. Pat. No. 4,320,498—Justice describes an automatic balancing duplexer for communication lines, in which the transmitted signal at the output of the duplexer is used to modulate the transmitted signal which is then injected into a feedback loop of the duplexer, to permit the telephone line to be terminated in a constant impedance.

U.S. Pat. No. 4,096,362 describes an automatic cable balancing network for a hybrid circuit between a bidirectional telephone cable and two unidirectional cables, wherein an adjustable impedance balance network has a plurality of controllable impedance elements which are adjusted to cause a driving point impedance to match the complex impedance of the transmission path.

The variety of local conditions and variations in the switched telephone network presented to stand-alone modems adapted to be connected to a variety of personal computers makes it desirable to provide an automatic line balancing circuit, which automatically balances impedances each time the telephone/computer interface is established.

Accordingly, one object of the present invention is to provide an improved telephone communications interface with an automatic line impedance balancing circuit.

Another object of the invention is to provide an improved modem for connecting a computer to a nondedicated telephone line and which automatically compensates for variations in line impedance.

DRAWINGS

The invention, both as to organization and method of practice, together with further objects and advantages thereof, will best be understood by reference to the following description, taken in connection with the accompanying drawings, in which:

FIG. 1 is a simplified diagram illustrating the environment in which the invention is designed to operate, FIG. 2 is a block diagram of the telephone communications interface, and, FIG. 3 is a schematic drawing, showing, in more detail, the relevant elements of the automatic line balancing circuit.

SUMMARY OF THE INVENTION

Briefly stated, the invention is practiced by providing a duplexer in a circuit with an isolation transformer for transmitting and receiving modulated carrier signals over the telephone lines. The duplexer includes a variable gain operational amplifier, having a feedback network of switches and resistors adapted to adjust the network resistance to thereby successively increase the amplifier gain under control of a computer program, so as to minimize the amplitude of any transmitted carrier signal appearing at the input to the receiver carrier signal filter. The switches are successively closed according to the contents of a shift register. The shift register is clocked after each sample is taken of the output from a line balance comparator circuit, until the output indicates that the line is balanced.

DESCRIPTION OF THE PREFERRED EMBODIMENT

Figure 1:
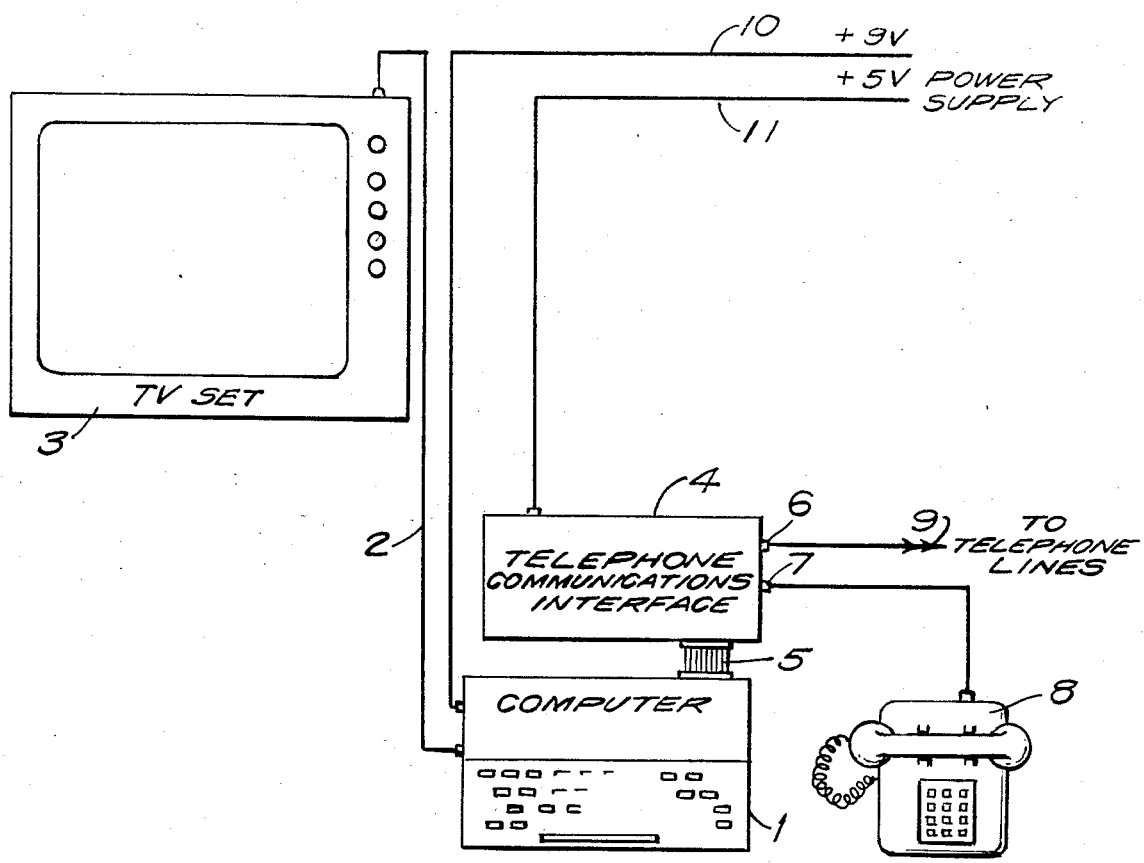

FIG. 1 of the drawing illustrates a personal computer 1 connected via lead 2 to the VHF antenna terminals of a television set 3. A telephone communications interface 4 is connected by a multiplicity of leads 5 to computer 1 and also has modular jack sockets 6, 7 for connecting to a conventional telephone set 8 and to telephone wall socket 9. Computer 1 and telephone communications interface 4 are connected by leads 10 and 11 to 9 volt and 5 volt dc power supplies respectively.

Figure 2:
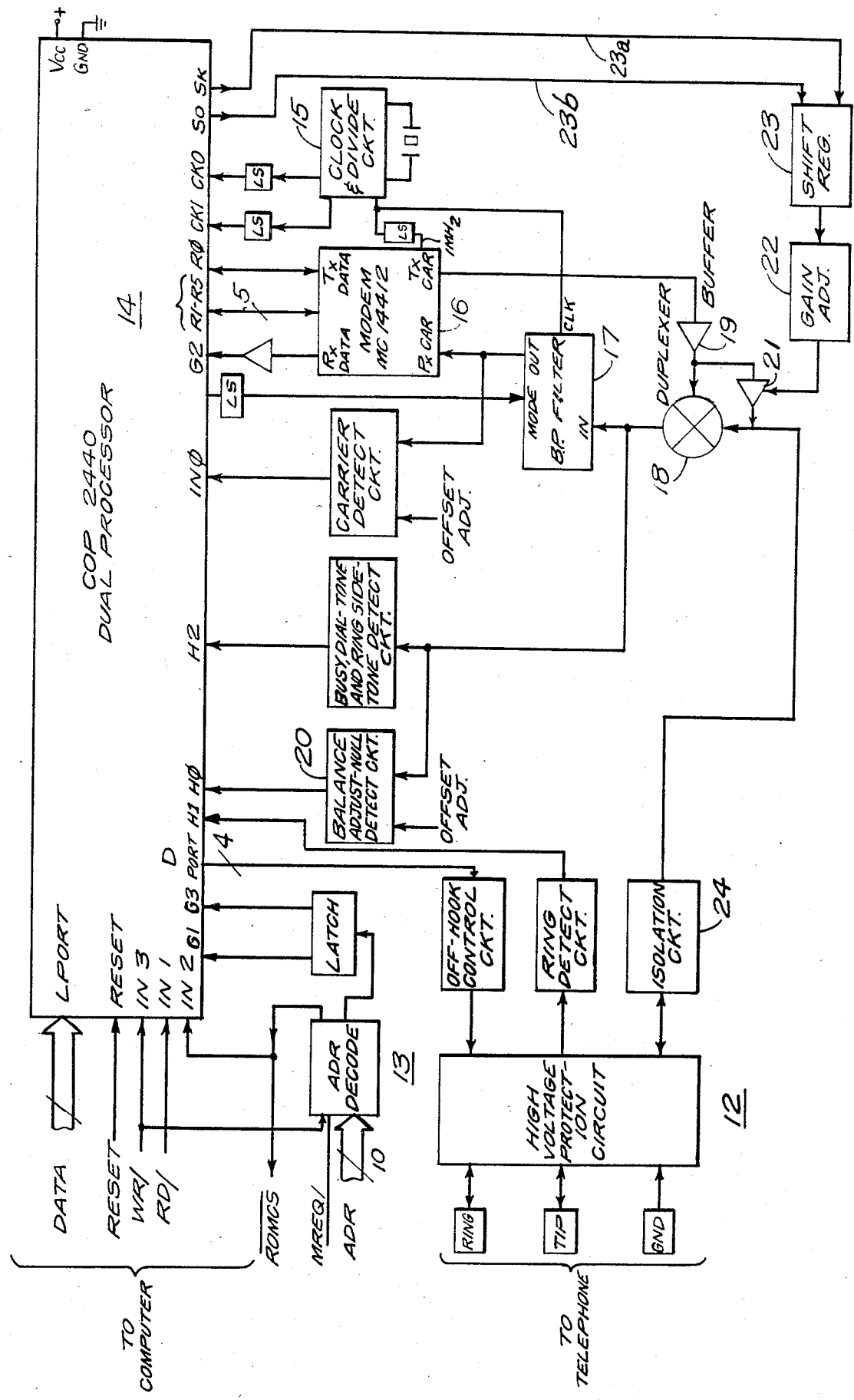

Referring to FIG. 2 of the drawing, a block diagram is shown of the telephone communciations interface 4, which consists of several functional circuits. The telephone interface circuit is shown generally at 12, and the computer interface circuit is shown generally at 13. Supervision over the flow of data to and from the telephone interface circuit 12 and computer interface circuit 13 is provided by a microcontroller 14. Although not required to the present invention, microcontroller 14 is preferably a COP 2440 dual processor manufactured by National Semiconductor Corporation and is a single-chip, dual CPU microcontroller, with internal ROM and RAM, and wherein one CPU is communicating with the computer over the interface circuit 13, while the other CPU is controlling the transmission of data to and from the telephone interface circuit 12. The operation details and software instructions for the COP 2440 and similar microcontrollers are contained in the "COPS Microcontrollers Databook" 1982 Edition by National Semiconductor Corporation, which is incorporated herein by reference. Conversion of parallel data into serial format and reconversion of received serial data back into parallel format, a function normally accomplished by another integrated circuit known as a Univeral Asynchronous Receiver Transmitter (UART) is performed, instead under control of a software program by the microcontroller 14.

A quartz crystal controlled clock pulse and frequency division circuit 15 provides a 4 MHz signal to pin CK1, a 2400 Hz signal to CK0 and 1 MHz to a modulator demodulator 16 and a band pass filter circuit 17. The modulator demodulator ("modem") is a commercially available, universal, low speed modem obtainable from Motorola Corporation as Part No. MC14412, which performs frequency shift keying (FSK) modulation of a sinusoidal carrier in accordance with transmitted digital data, and demodulation of a received FSK modulated carrier signal into digital data. The filter 17 is a commercially obtainable band pass filter, such as R5630 from Reticon Corporation, which will operate either in "originate" mode or "answer" mode to attenuate out-of-band noise and the adjacent transmit signal by only passing frequencies of approximately 1800-2400 Hz (originate modem) or 900-1500 Hz answer modem). A duplexer circuit 18 with a buffer amplifier 19 provides for full duplex operation over two wire telephone circuits. The present modem is arranged for full duplex operation, in accordance with whether it is in the "originate" mode—transmit on 1070/1270 Hz and receive on 2025/2225 Hz, or whether it is in the "answer" mode—transmit on 2025/2225 Hz and receive 1070/1270 Hz. One output from duplexer 18 is supplied to a balance adjust—null detection circuit 20 which is connected to pin H0 on microcontroller 14.

In accordance with the present invention, an operational amplifier 21 has its gain adjusted by a variable impedance network 22, in accordance with the contents of a shift register 23. The shift register is clocked by signals received at pin $S_k$ over lead 23a, and data is supplied to the shift register over lead 23b from pin SO. The output of amplifier 21 is connected to an isolation circuit 24 in which the high voltage signals of the telephone circuit 12 are coupled to, but isolated from, the low voltage signals from the microcontroller and associated circuits.

Figure 3:
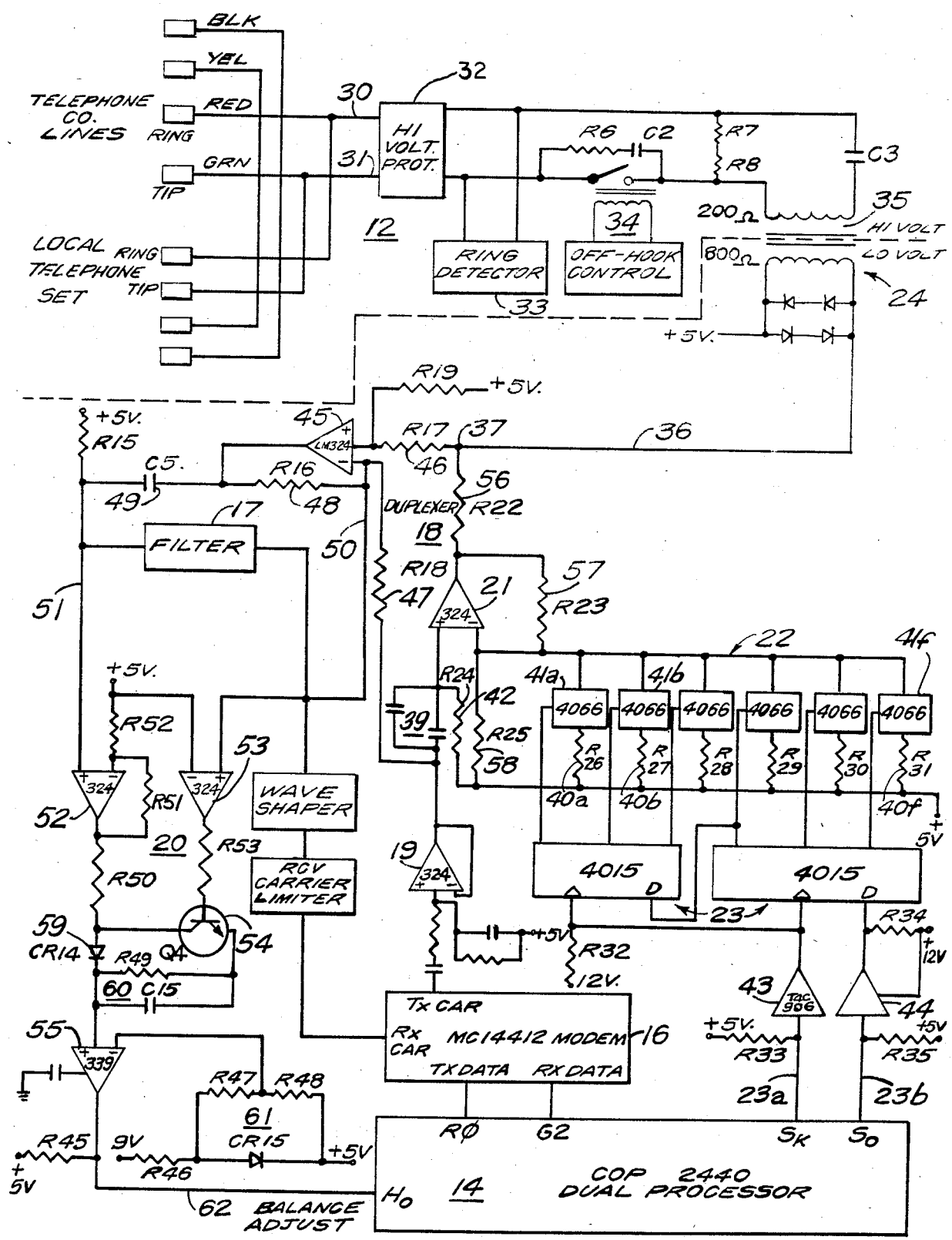

The details of the line impedance balancing circuit are shown in FIG. 3 of the drawing, wherein elements shown in FIG. 2 which are not material to the present invention have been omitted. Like elements have been labeled with the same reference numbers where possible. The entering "ring" and "tip" telephone lines from the telephone company are connected to the local telephone set and a connection is made in parallel with the wires 30, 31 of the telephone interface circuit 12. High voltage protection circuit 32 prevents high voltage surges. A ring detector 33 detects rings on the line, and an off-hook controller 34 connects or disconnects the telephone interconnection device. Voltage isolation is provided by means of an isolation transformer 35 which is connected via lead 36 to the duplexer 18. The high voltage protection circuit 32 protects the contacts at 34 from arc-over to the relay coil and thus to the low voltage circuits, and to prevent high voltages at 35 from appearing anywhere in the low voltage circuits of the microcontroller. One side of the isolation transformer 35 is pulled up to +5 volts for reasons to be explained later.

Lead 36 connects the transformer to a junction 37, which is a node for the transmitted and received carrier signals of duplexer 18. A first operational amplifier 21 has an output connected through a resistor 56 to node 37. The operational amplifier 21 has its non-inverting input connected to the output of a buffer amplifier 19, via coupling capacitors 39, and has a variable impedance network 22 connected in circuit with a feedback resistor 57 to the other input of the operational amplifier 21.

The variable impedance network 22 comprises a number of parallel branches, each comprising a resistor such as 40a-40f selectively controlled by respective transmission gate switches 41a-41f. The parallel circuit of selectively connectable resistances is connected in parallel with a resistor 58 to the inverting input of the amplifier 21, so that its gain can be adjusted by selectively closing the switches 41a-41f. The transmission gates have control inputs connected to shift registers 23. The shift registers have clock inputs connected to lead 23a via inverter 43, and with a data input connected to lead 23b via an inverter 44.

The other portion of duplexer 18 handles the received carrier signal over a second operational amplifier 45. One input is connected via a resistor 46 to node 37, while the other input is connected by way of resistor 47 to the output of buffer amplifier 19. A feedback resistor 48 is connected between the output of amplifier 45 and one input, and its output connected via coupling capacitor 49 to the band pass filter 17.

In accordance with the present invention, lead 50 and lead 51 connected to the input and output respectively of operational amplifier 45 are also connected to the input of the balance adjust-null detection circuit 20.

Circuit 20 consists of third and fourth operational amplifiers 52, 53. The output of amplifier 53 is connected to the base of transistor 54, and the output of amplifier 52 is connected in series with the collector/emitter of transistor 54, and to one input of a comparator 55 through a diode 59, and parallel filter circuit 60. The other input of comparator 55 is connected to a dc bias circuit 61. The output of comparator 55 is connected via lead 62 to pin $H_0$ of microcontroller 14.

The operation of the balance adjust-null detection circuit 20 is as follows. The output of amplifier 53 serves to demodulate the output of amplifier 52 via transistor 54, so as to perform a half wave demodulation into a dc level via diode 59. The filter circuit 60 filters this dc level, which is connected to one input of comparator 55. If the dc input to comparator 55 is greater than that set by the dc bias circuit 61, then an output will be sent over line 62 to the microcontroller indicating that the line is not balanced.

One input to the balance adjust-null detection circuit 20 is the same as the input to amplifier 45 (lead 50), while the other input to circuit 20 is the output from amplifier 45 (lead 51).

COMPUTER PROGRAM

The microcontroller 14 controls the gain of amplifier 21 under control of a Automatic Line Balance subroutine, the relevant portions of which are reproduced below. The output condition of the balance adjust-null detection circuit 20 is input as one bit $H_0$ of the four bit H input port on microcontroller 14. The microcontroller output lines $S_k$ and $S_0$ are manipulated by the program until there is a change in the input bit $H_0$, indicating that the amplitude of the transmit carrier appearing at the filter input from the duplexer has been minimized.

In the following program, the columns are identified as follows. The first column is a decimal, serialized listing number. The second column is the ROM memory location in hexadecimal. The third column is the object code in hexadecimal. The fourth column gives the subroutine labels. The fifth column gives the source code mnemonics from the COP instruction set, the sixth column gives the location or data to be operated on, and the last column contains comments or explanation.

;AUTOMATIC LINE BALANCE

;Subroutine automatically adjusts gain to compensate
;for variations in Tel Co line impedance. Purpose
;is to minimize amplitude of transmit carrier
;appearing at receive filter input.

| | | | | | | |
|---|---|---|---|---|---|---|
| 534 | 3CB | 6FBE | ALNBLN: | JSR | DLY800 | ;DELAY 800 msec. |
| 535 | 3CD | 33B7 | | LBI | STEPLO | ;LOC (3,7) |
| 536 | 3CF | 70 | | STII | 0 | |
| 537 | 3D0 | 7C | | STII | 12 | ;INIT STEP COUNTER (for 63 counts) |
| 538 | 3D1 | 6BC0 | | JSR | OFFHUK | ;GO OFF-HOOK |
| 539 | 3D3 | 33D9 | | LBI | TIMELO | ;LOC (5,9) |
| 540 | 3D5 | 70 | | STII | 0 | |
| 541 | 3D6 | 7E | | STII | 14 | |
| 542 | 3D7 | 69BF | | JSR | MTMEDL | ;DELAY 250 msec. |
| 543 | 3D9 | 00 | | CLRA | | |
| 544 | 3DA | 3398 | | LBI | DTCTR | ;LOC (1,8) |
| 545 | 3DC | 06 | | X | | ;RESET DIAL TONE COUNTER |
| 546 | 3DD | 33D9 | ALB7: | LBI | TIMELO | ;SET-UP DELAY (LOC 5,9) |
| 547 | 3DF | 7A | | STII | 10 | ;SET-UP 'T' COUNTER FOR 5 msec |
| 548 | 3E0 | 76 | | STII | 6 | |
| 549 | 3E1 | 77 | | STII | 7 | ;SET-UP LOOP CTR FOR 7 LOOPS |
| 550 | 3E2 | 70 | | STII | 12 | ;SET-UP MULT DLY FOR 50 LOOPS |
| 551 | 3E3 | 7O | | STII | 12 | ; OF 'T' CNTR DLY (.25 sec) |
| 552 | 3E4 | 6B4B | | JSR | TRSIDE | ;LOOK FOR DIAL (debounce 2.5 sec) |
| 553 | 3E6 | 3388 | | LBI | ASTATH | |
| 554 | 3E8 | 03 | | SKMBZ | 2 | ;SKIP IF NO DIAL |
| 555 | 3E9 | 63F6 | | JMP | TONEOK | |
| 556 | 3EB | 3398 | | LBI | DTCTR | |
| 557 | 3ED | 05 | | LD | | |
| 558 | 3EE | 54 | | AISC | 4 | ;INCR. DIAL TONE CTR |
| 559 | 3EF | 63F3 | | JMP | ALB8 | ;LOOP 4 TIMES TOTAL (each loop 2.5 sec) |
| 560 | 3F1 | 65D2 | | JMP | ALBERR | ;TIME-OUT (10 sec) |
| 561 | 3F3 | 06 | ALB8: | X | | ;SAVE LOOP |
| 562 | 3F4 | 63DD | | JMP | ALB7 | |
| 563 | 3F6 | 3395 | TONEOK: | LBI | DATX1L | ;LOC (1,5) |
| 564 | 3F8 | 71 | | STII | 1 | ;SET DIGIT = 1 |
| 565 | 3F9 | 6B94 | | JSR | PDIAL | ;DIAL DIGIT |
| 566 | 3FB | 6F9D | | JSR | DL50MS | ;DLY 50 msec |
| 568 | 3FD | 65A4 | | JMP | X'5A4 | |
| 571 | 5A4 | 699F | | JSR | LRPFOP | ;ASSERT XMIT CARRIER |
| 572 | 5A6 | 6F80 | | JSR | SEROUT | ;OUTPUT INITIAL COUNT |
| 573 | 5A8 | 6F9D | | JSR | DL50MS | ;DLY 50 msec |
| 574 | 5AA | 3A | | LBI | HIPSTG | |
| 575 | 5AB | 332B | | INH | | ;GET STATE OF LINE BAL COMPARATOR |
| 576 | 5AD | 06 | | X | | ;AND SAVE |
| 577 | 5AE | 45 | | RMB | 1 | |
| 578 | 5AF | 42 | | RMB | 2 | |
| 579 | 5B0 | 43 | | RMB | 3 | ;MASK LSB |
| 580 | 5B1 | 6F80 | ALB5: | JSR | SEROUT | ;OUTPUT STEP COUNT TO GATE ARRAY |
| 581 | 5B3 | 6F92 | | JSR | DL10MS | ;DLY 10 msec |
| 582 | 5B5 | 33B1 | | LBI | SCRAT2 | ;LOC (3,1) |
| 583 | 5B7 | 332B | | INH | | ;GET STATE OF LINE BAL COMPARATOR |
| 584 | 5B9 | 06 | | X | | ;STORE IN (3,1) |
| 585 | 5BA | 45 | | RMB | 1 | |
| 586 | 5BB | 42 | | RMB | 2 | |
| 587 | 5BC | 43 | | RMB | 3 | ;MASK LSB |
| 588 | 5BD | 05 | | LD | | |
| 589 | 5BE | 3A | | LBI | HIPSTG | ;GET 'OLD' STATE OF COMPARATOR |
| 590 | 5BF | 21 | | SKE | | ;SKIP IF BAL. COMP. DID NOT CHANGE S |
| 591 | 5C0 | 65D8 | | JMP | ALBFIN | |
| 592 | 5C2 | 33B7 | | LBI | STEPLO | ;AT LOC (3,7) |
| 593 | 5C4 | 05 | | LD | | ;GET LSN OF STEP CTR |
| 594 | 5C5 | 51 | | AISC | 1 | ;SKIP IF LSN OVERFLOW |
| 595 | 5C6 | 65CF | | JMP | ALB6 | |
| 596 | 5C8 | 04 | | XIS | | |
| 597 | 5C9 | 05 | | LD | | ;GET MSN OF STEP CTR |
| 598 | 5CA | 51 | | AISC | 1 | ;SKIP IF MSN OVERFLOW |
| 599 | 5CB | 65CF | | JMP | ALB6 | ;CONTINUE STEPPING GAIN |
| 600 | 5CD | 65D2 | | JMP | ALBERR | ;MAX COUNT - CAN'T BALANCE LINE |
| 601 | 5CF | 06 | ALB6: | X | | ;SAVE STEP COUNT |
| 602 | 5D0 | 65B1 | | JMP | ALB5 | ;CONTINUE STEPPING GAIN |
| 603 | 5D2 | 0A | ALBERR: | LBI | STER2L | |
| 604 | 5D3 | 46 | | SMB | 2 | ;SET 'CANNOT BALANCE LINE' ERROR |
| 605 | 5D4 | 08 | | LBI | STAT1L | |
| 606 | 5D5 | 46 | | SMB | 2 | ;SET ERROR DETECT FLAG |
| 607 | 5D6 | 65EB | | JMP | ABLEND | ;DONE |

-continued

| | | | | | | |
|---|---|---|---|---|---|---|
| 609 | 5D8 | 33B8 | ALBFIN: | LBI | STEPHI | ;LOC (3,8) |
| 610 | 5DA | 05 | | LD | | |
| 611 | 5DB | 53 | | AISC | 3 | ;SKIP IF WITHIN RANGE (D0 - FF) |
| 612 | | | | | | ;FOR OFFSET COMPENSATION |
| 613 | 5DC | 65EB | | JMP | ABLEND | |
| 614 | 5DE | 33B7 | | LBI | STEPLO | ;LOC (3,7) |
| 615 | 5E0 | 05 | | LD | | |
| 616 | 5E1 | 56 | | AISC | 6 | ;SUBTRACT 10 FROM COUNT |
| 617 | 5E2 | E4 | | JP | BORRW | |
| 618 | 5E3 | E8 | | JP | NBORW | |
| 619 | 5E4 | 04 | BORRW: | XIS | | ;BORROW |
| 620 | 5E5 | 05 | | LD | | |
| 622 | 5E7 | 44 | | NOP | | |
| 623 | 5E8 | 06 | NBORW: | X | | |
| 624 | 5E9 | 6F80 | | JSR | SEROUT | ;OUTPUT MODIFIED COUNT |
| 625 | 5EB | 3361 | ABLEND: | LEI | 1 | ;DISABLE SERIAL OUTPUT |
| 626 | 5ED | 6FC5 | | JSR | CAROFF | ;TURN OFF XMIT CARRIER |
| 627 | 5EF | 6BC6 | | JSR | ONHOOK | ;HANG-UP |
| 628 | 5F1 | 6FBE | | JSR | DLY800 | ;DELAY 800 msec. |
| 629 | 5F3 | 6007 | | JMP | SOFTIN | |
| 630 | | | | | | |
| 631 | 5F5 | 6780 | | JMP | X'780 | |
| 632 | | 0780 | | | =X'780 | |
| 633 | | | | | | |
| 634 | 780 | 33B8 | SEROUT: | LBI | STEPHI | |
| 635 | 782 | 05 | | LD | | |
| 636 | 783 | 33B7 | | LBI | STEPLO | |
| 637 | 785 | 336C | | LEI | 12 | ;ENABLE SO,DISABLE INTR,ENABLE SK |
| 638 | 787 | 22 | | SC | | ;SET CARRY TO ENABLE SK AS SYNC |
| 639 | 788 | 4F | | XAS | | ;START SYNC, A TO SIO, START |
| 640 | 789 | 00 | | CLRA | | ;SHIFTING OUT 4 MSB'S (IN A) |
| 641 | 78A | 00 | | CLRA | | ;FOR GAIN STEP COUNT |
| 642 | 78B | 05 | | LD | | ;LOAD LO NIBBLE STEP COUNT |
| 643 | 78C | 4F | | XAS | | ;CONTINUE SHIFTING LO NIBBLE |
| 644 | 78D | 00 | | CLRA | | |
| 645 | 78E | 00 | | CLRA | | ;WAIT 4 INSTR CYCLE TIMES |
| 646 | 78F | 32 | | RC | | ;RESET C TO DISABLE SK AS SYNC |
| 647 | 790 | 4F | | XAS | | ;DISABLE SYNC PULSE |
| 648 | 791 | 48 | | RET | | |
| 649 | | | | | | |
| 650 | 792 | 33D9 | DL10MS: | LBI | TIMELO | ;AT (59) |
| 651 | 794 | 7C | | STII | 12 | |
| 652 | 795 | 7E | | STII | 14 | |
| 653 | 796 | 33DE | | LBI | TIME2 | ;AT (5,E) |
| 654 | 798 | 7F | | STII | 15 | |
| 655 | 799 | 74 | | STII | 4 | |
| 656 | 79A | 69C5 | | JSR | LOOP2 | ;DELAY 10 msec |
| 657 | 79C | 48 | | RET | | |
| 658 | | | | | | |

The initial part of the program through line 571 concerns initialization of the counters, testing for a dial tone, dialing a number, and turning on the transmitter carrier signal to amplifier 38.

The subroutine SEROUT at listing lines 634–648 enables the processor output lines $S_K$ and $S_O$, so that $S_O$ transmits data bits in the accumulator to shift register 23 when clocked by synchronized output signals on $S_K$. Each iteration of subroutine SEROUT closes a successive switch in the variable impedance circuit 22, commencing with switch 41f. The status of $H_O$ is saved in memory location HIPSTG, and the irrelevant bits $H_1$, $H_2$, and $H_3$ are masked, as shown in the listing at lines 574–579.

Lines 580–590 provide a loop, wherein the gain is successively changed for another step through calling SEROUT (line 580), and the resulting new condition of bit $H_O$ is compared (line 590). The process is continued until bit $H_O$ changes state, whereupon the line balance process is terminated (lines 625–629).

OPERATION

The operation of the invention may be briefly described as follows, by reference to FIG. 3. Referring to the isolation transformer 35, the line impedance is reflected in the voltage drop across the isolation transformer, due to electromagnetic coupling with the transformer coil on the telephone side. This voltage drop, combined with the voltage drop across resistor 56 at the output of amplifier 21 acts like a voltage divider to vary the voltage at node 37, which serves as an input to the other operational amplifier 45 of the duplexer through input resistor 46. The input voltage to operational amplifier 21 is also supplied to the other input of operational amplifier 45 through a resistor 47 of the same value as resistor 46.

Suppose that the gain of amplifier 21 is 2, between input and output. If the voltage drop across resistor 56 and the voltage drop across isolation transformer 24 are equal, then the voltage at node 37 matches that at the input to amplifier 21, indicating that no part of the transmitted signal is getting back into the input and the line is therefore balanced.

If the line impedance decreases, the voltage at node 37 becomes lower than that at the input to amplifier 21. Therefore, the gain of amplifier 21 must be increased in order to raise the voltage at node 37 to the point where it again balances the input voltage. The overall gain is raised by successively closing a suitable combination of switches 41a–41f in order to lower the feedback resistance of amplifier 21 by lowering the effective resistance which is connected in parallel with resistor 58.

When the line is perfectly balanced, the output (transmitted) signal from amplifier 21 will not be passed through the duplexer back to the input filter 17 to desensitize the gain of the input signal. By using the transmitted carrier as a reference signal to amplifier 53 of the balance adjust-null detection circuit 20, any unbalance condition continues to automatically change the gain of amplifier 21 until balance is achieved.

Through the use of the invention, the line impedance is automatically balanced without need for operator intervention or manual adjustment. This enables the telephone communications interface to be employed in a wide variety of conditions, with different types of equipment and without regard to variations in the switched telephone network line impedance.

While there has been described what is considered to be the preferred embodiment of the invention, other modifications will become apparent to those skilled in the art, and it is desired to cover in the appended claims all such modifications as fall within the true spirit and scope of the invention.

I claim:

1. Automatic line balancing circuit for a telephone/computer interface comprising:

a modulator/demodulator arranged to send and receive FSK modulated carrier signals including at least one transmitted carrier signal and at least one received carrier signal, to and from telephone lines of varying impedance, a microcontroller connected to the modulator/demodulator arranged to transmit and receive digital data therefrom, an isolation transformer coupled to said telephone lines for receiving and transmitting said carrier signals, a duplexer connected between the isolation transformer and the modulator/demodulator, said duplexer having a first variable gain operational amplifier having a first input connected to receive said transmitted carrier signal and supply it to said isolation transformer through an output impedance connected to a junction, said duplexer having a second operational amplifier with a first input connected to said junction to amplify said received carrier signal from said transformer and a second input connected to the first input of said first operational amplifier, a balance adjust-null detection circuit connected between said second input of the second amplifier and the output of the second amplifier and adapted to provide an output signal upon presence of transmitted carrier signal through said second amplifier, and means for varying the gain of the first amplifier in response to output from said balance adjust-null detection circuit, said gain varying means comprising a line balancing program controlling said microcontroller to periodically sample the output from said balance adjust-null detection circuit and to periodically change the gain of said first amplifier to reduce line unbalance at the telephone/computer interface.

2. The combination according to claim 1, wherein said microcontroller is a single chip processor with a ROM incorporating said line balancing program.

3. The combination according to claim 1, wherein said variable gain operational amplifier comprises a network of parallel branches of series-connected switches and resistors connected to change the gain of the amplifier by opening and closing selected switches.

4. The combination according to claim 3, wherein said switches are transmission gates and further including shift register means having a plurality of outputs connected to control the transmission gates, said shift register means having its inputs connected to the microcontroller.

5. The combination according to claim 1, wherein the balance adjust-null detection circuit has first and second inputs connected to the second input and to the output of said second amplifier, and includes a comparator providing said output signal when the difference between its input exceed a preselected value, said balance adjust-null detection circuit output being connected to said microcontroller.

6. The combination according to claim 1, wherein said microcontroller line balancing program is arranged to initiate transmission and receipt of carrier signals, and to increase said first operational amplifier gain until the output of said balance-adjust null detection circuit changes, and thereupon to terminate adjustment of gain of the first amplifier.

* * * * *